(12) United States Patent
Gendron

(10) Patent No.: US 7,365,443 B2
(45) Date of Patent: Apr. 29, 2008

(54) GENERATOR START/STOP CONTROLLER

(76) Inventor: Jack Delbert Gendron, 5702 No. 14th. St., Tacoma, WA (US) 98406

( * ) Notice: Subject to any disclaimer, the term of this patent is extended or adjusted under 35 U.S.C. 154(b) by 126 days.

(21) Appl. No.: 11/473,770

(22) Filed: Jun. 23, 2006

(65) Prior Publication Data
US 2007/0296379 A1 Dec. 27, 2007

(51) Int. Cl.
 *F02N 17/00* (2006.01)
(52) U.S. Cl. .......... 290/40 C; 290/31; 322/10
(58) Field of Classification Search .......... 290/1 A, 290/31, 40 C, 46; 322/10; 123/179.4
See application file for complete search history.

(56) References Cited

U.S. PATENT DOCUMENTS

| | | | | |
|---|---|---|---|---|
| 5,642,696 A | * | 7/1997 | Matsui | 123/179.1 |
| 5,966,000 A | * | 10/1999 | Yang | 322/23 |
| 5,977,647 A | * | 11/1999 | Lenz et al. | 290/40 C |
| 7,023,102 B2 | * | 4/2006 | Itoh | 290/40 C |
| 7,032,393 B2 | * | 4/2006 | Tamai et al. | 62/115 |

* cited by examiner

Primary Examiner—Nicholas Ponomarenko

(57) ABSTRACT

A method and apparatus is disclosed for starting and stopping a generator set that supplies power to a refrigeration system. An ambient temperature sensor is used rather than an in-box sensor in addition to a programmed microprocessor to regulate the operation of the generator. Unnecessary use of the generator is, thereby, limited which contributes to cost, energy and equipment savings and a cleaner environment while ensuring the required in-box temperature is maintained and the quality of perishable goods are not compromised.

18 Claims, 1 Drawing Sheet

GENERATOR START/STOP CONTROLLER

BACKGROUND OF THE INVENTION

The present invention relates generally to a method of controlling a refrigeration system. More particularly, the invention relates to a method of controlling the start/stop of a generator that powers a refrigeration system used on containers transporting frozen goods via rail or roadway.

It is common in the field of transport refrigeration to control the start/stop of the generator and thereby, the compressor (refrigeration system) and circulating fans by monitoring the temperature of the inside of the container with an in-box temperature sensor.

In a typical system, frozen goods at 0 degrees Fahrenheit are loaded into an insulated refrigeration container destined for transit by ship, railcar or truck. Each container is supplied with its own independent refrigeration system and circulating fans. The system and fans are designed with sufficient capacity to maintain a pre-set box temperature of varying degrees F. for the duration of the trip. While on board ship, the containers can be connected to a ship's generator to provide power to the refrigeration systems. When the containers are in port, they may be connected to a power source provided by a local utility.

When, however, the containers are in transit by railcar or truck, it must have its own generator. For railcar transport, up to 10 refrigeration containers may be loaded on a single railcar and powered by one generator mounted on the same railcar. For truck transport, each container must have its own generator which is clipped directly to the container or fastened to a container chassis. The generators are usually the gas or diesel fuel-type and consume an average of 1 gallon per hour. The generator's fuel tank typically holds 130 gallons of fuel.

The refrigeration compressor automatically cycles on as the in-box temperature sensor signals the need for a reduction in temperature and off when the pre-set temperature is reached. The in-box sensor only controls the operation of the compressor. The generator is not turned off. It continues to run throughout the trip to power the circulating fans regardless of whether the compressor is on or off and regardless of the in-box temperature or the ambient temperature (the temperature outside the box).

On most cross-country rail or roadway trips, continuous operation of the generator consumes the entire 130 gallons of fuel well before the container's destination. This requires a refueling process, the man-power and fueling facilities at various points along the way. Since containers begin and end their routes from various locations, it is virtually impossible to predict where and when refueling is required. Quite often, along the route, a generator dies for lack of fuel and does not get refueled and restarted and the frozen contents of the container are at the risk of perishing.

It is well known that the circulating fans in the container have minimal effect in efficiently moving chilled air to every part of a container fully loaded with frozen goods. It is also well known that circulating fans generate a significant amount of BTUs/min., thereby counterproductively contributing to the raising of the in-box temperature. In addition, should the compressor experience failure during transit, the fans, since they are not controlled by the in-box temperature sensor, would continue to run and ultimately raise the in-box temperature to a point where the frozen goods would perish.

It is, therefore, questionable that the continuous operation of the circulating fans is justified considering: (1) the amount of fuel and expense required to operate the generator when it is operating solely to power the fans; (2) the effectiveness of the fans; (3) the fact that the fans themselves, when operating, contribute to raising the in-box temperature, thereby decreasing the overall efficiency of the refrigeration system, and; (4) the risk of loosing a load of perishable goods if the compressor were to fail in transit.

This is especially questionable, when the container is transported through an area of the country where the ambient temperature is the same as or below the required in-box temperature. In these conditions, there is no need for the circulating fans to be operating and therefore, no need for the generator to be running. While the generator is operated during this period: (1) generator running time and its associated maintenance costs, man power and fuel consumption are a total waste, and; (2) the environment is unnecessarily contaminated.

A number of devices and methods have been proposed for controlling generators. None of these, however, have addressed the serious problem of generators that are operating unnecessarily.

U.S. Pat. No. 5,977,646 to Lenz et al. discloses a method for automatically restarting a generator set following a nuisance shutdown.

U.S. Pat. No. 5,561,330 to Crook discloses an automatic electric power generator control that automatically starts the generator engine and the generator when a demand is made for electric power.

U.S. Pat. No. 4,286,683 to Zeigner et al. and U.S. Pat. No. 5,072,703 to Sutton disclose systems for automatically stopping and restarting the internal combustion engine of a vehicle.

The foregoing illustrates limitations known to exist in present devices and methods. Thus, it would be advantageous to provide an alternative device and method of limiting the running time of a generator during its transit so as to reduce fuel consumption, reduce overall operational and maintenance costs, and reduce environmental contamination while safely ensuring the goods in transit are kept frozen at the required in-box temperature.

SUMMARY OF THE INVENTION

It is, therefore, an object of the present invention to provide a generator start/stop controller that uses an ambient temperature sensor rather than an in-box sensor in addition to a programmed microprocessor to regulate the operation of the generator. When the container is transported through an area where the ambient temperature is the same as or less than the required in-box temperature, the generator is automatically turned off completely. This contributes enormously to cost, energy and equipment savings and provides a cleaner environment.

In addition, it is an object of the present invention to provide a generator start/stop controller that uses pre-calculated settings and programming to automatically turn the generator back on, not simply when the ambient temperature is the same as or greater than the required in-box temperature, but only when the container has experienced a period of time in a high heat zone sufficient to compromise the required in-box temperature and the quality of the frozen goods in transport. This further contributes to cost, energy and equipment savings and also a cleaner environment.

The invention proposes to avoid having to provide an in-box temperature sensor and an electrical conductor for the temperature sensor connected between the container and the generator as is the case with in-box temperature sensing systems. This is especially advantageous on a railway system where several refrigerated containers are operated via individual power cords from a single generator/compressor unit. These power cords must provide a separate conductor dedicated to the temperature sensor. Since ambient temperature is used in the present invention to control the run-time of the generator, the temperature sensor may be installed with the controller directly on the generator unit and the separate temperature sensor conductor is not required. In addition to cost savings in the reduced quantity of sensors and conductors required per generator unit, there are installation, maintenance, and operational advantages, as well.

The invention also proposes to be capable of controlling the start/stop of generators manufactured by any major manufacturer of such components and be retrofitably installed on such components.

BRIEF DESCRIPTION OF THE DRAWING

The invention will become more apparent by reading the following detailed description in conjunction with the drawing, which is shown by way of example only, wherein.

DESCRIPTION OF THE PREFERRED EMBODIMENT

Figure 1:
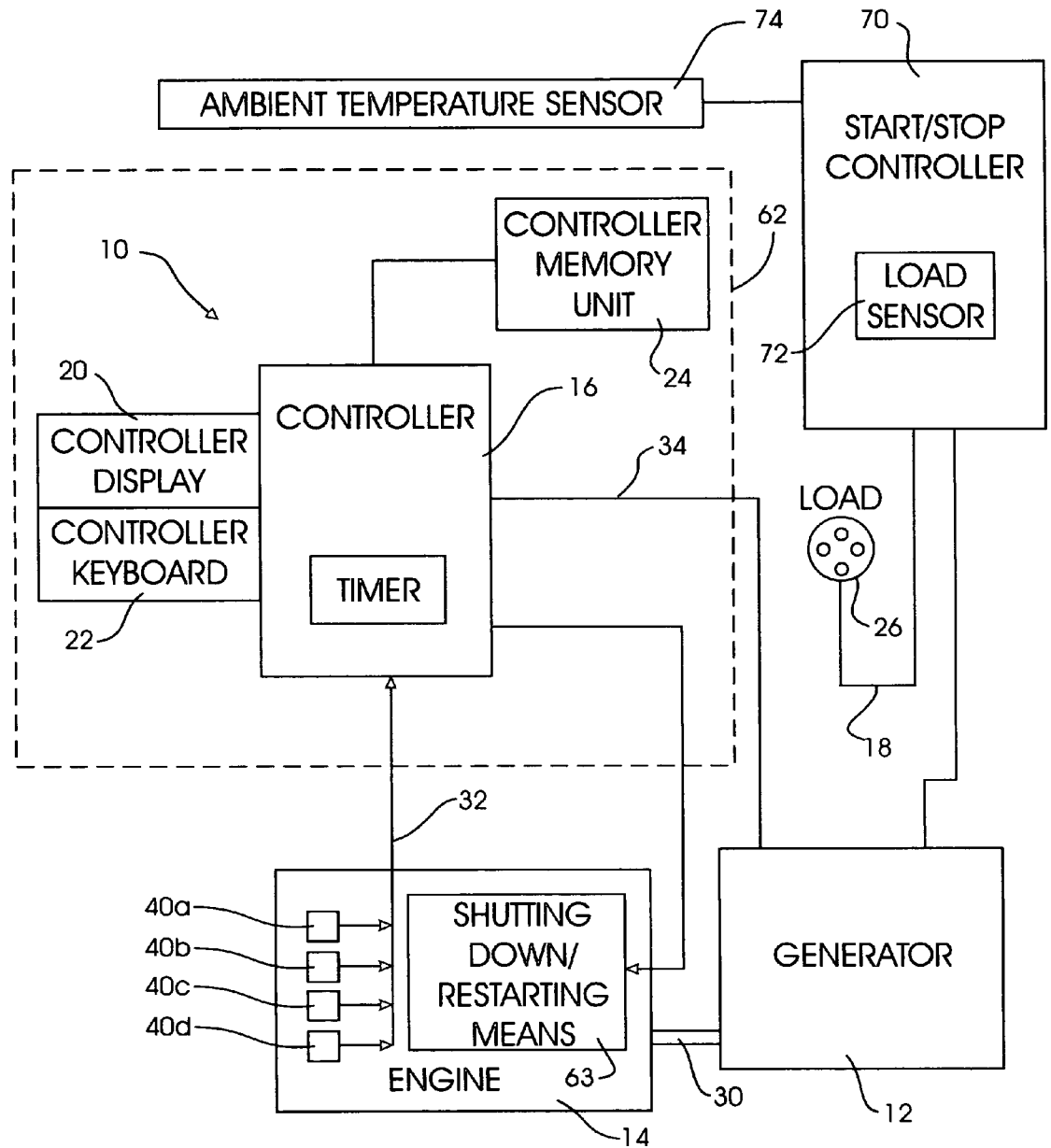
FIG. 1 is a block diagram of a generator start/stop controller which may be operated according to the methods of the invention.

Referring now to FIG. 1, a generator set 10 in accordance with the present invention is shown in block drawing form. Generator set 10 includes three principle components, a generator 12, engine 14 and a controller 16. The controller is enclosed by enclosure walls 62 represented in a dash-lined box in FIG. 1.

Engine 14 is preferably an industrial duty diesel engine. Such an engine would include a cooling system, an oil lubricant system, an electrical system including a battery, an alternator and glow plugs. Its fuel system would include a fuel tank and a fuel solenoid for controlling the flow of fuel to the cylinders. A drive shaft 30 transfers energy from the engine to the generator. The engine 14 also includes means for shutting down and restarting the engine 14. The shutting down/restarting means is identified generally at 63 in FIG. 1. The shutting down/restarting means 63 is collectively comprised of well known electronically actuated components such as a fuel valve and a starter, and also may include a fuel/engine preheating device if the engine 14 is a diesel engine. As shown in FIG. 1, means 63 is in signal receiving relation with controller 16. When it is necessary to shut down the engine, the controller 16 sends a signal to each of the components comprising the shutting down/restarting means 63, which thereby closes or otherwise shuts down the components and as a result, causes the engine 14 to shut down. Conversely, when it is necessary to restart the engine 14, a signal is sent by the controller 16 to the shutting down/restarting means 63 components to open an/or actuate the components and thereby restart the engine 14.

Generator 12 could be, for example, a 15 KW, 18.75 KVA, 230, 460 VAC, 3-phase, 60 Hz direct drive, brushless generator. Anyone skilled in the art would recognize that other generators could be advantageously used and that the specifically recited generator is an example only. The above-described generator, as indicated, can be wired for 230 V and 460 V AC power output. Power cable 18 can be used to deliver power to a temperature control unit for a cargo container or other application.

Controller 16 includes the standard controls for operating a generator set as known to those skilled in the art. The controller 16 is connected to the engine 14 and generator 12 to perform routine functions such as operator-initiated engine startups and shutdowns. The engine 14 and generator 12 are electrically connected to controller 16 by connecting cable means 32 and 34 respectively. The controller 16 is also connected to various engine component sensors. For example, the controller 16 can be connected to a water temperature sensor, engine rpm sensor, oil pressure sensor, and air flow sensor. Such sensors are represented generally as 40a, 40b, 40c, and 40d in FIG. 1 and are shown in signal transmitting relation with the controller 16.

Controller 16 includes processor logic which can be executed by a microprocessor to make various engine operating decisions in response to determined engine operating parameters based upon control sensor readings. These control processors are discussed in more detail below.

Controller 16 preferably includes an operator interface including a controller display 20, which could be, for example, an LCD display. Controller 16 also includes a keyboard 22 for entering commands. Controller 16 includes a memory unit 24, such as a Random Access Memory (RAM) which can maintain a log of certain engine operating parameters, their values and the time at which those values occurred particularly when an engine shutdown resulted. Memory unit 24 can be used to store other data as well.

The arrangement of generator set components described above can advantageously be used to execute the method of the present invention by one skilled in the art. If a generator set shutdown occurs, the engine will not automatically restart if the processor determines that, based upon sensor readings, certain engine operating parameters are outside of the appropriate ranges.

Engine shutdowns can be controller-initiated if a generator set operating parameter being monitored by the controller is determined by the controller to be outside of normal operating ranges.

Additional controls to perform the alternative method, in accordance with the present invention, are hereby described. The start/stop controller 70 is connected between generator 12 and load 26 via power cable 18 so that high voltage current flow may be interrupted for control purposes. During normal generator running operations the load sensor 72 sends a signal to the start/stop controller 70. The start/stop controller 70 thereby, determines when to disconnect the high voltage current between generator 12 and load 26 and then disconnect the control voltage to controller 16 thereby initiating the engine 14 shutdown. During the shut down cycle ambient temperature sensor 74 sends a signal to the start/stop controller 70. The processor logic of start/stop controller 70 determines when to reconnect control voltage to controller 16 and, therefore, initiate the engine 14 start sequence. After a predetermined time, the processor logic of start/stop controller 70 determines when to reconnect high voltage current between generator 12 and load 26.

This invention is intended to work in conjunction with and supplemental to, existing controls and in no way to interfere with normal engine control systems. All existing safety circuits, automatic control methods and other integral system components are left undisturbed.

Numerous characteristics and advantages of the invention covered by this disclosure have been set forth in the foregoing description. It will be understood, however, that this presentation is, in many respects, only illustrative. Changes may be made in details, particularly in matters of shape, size and arrangement of parts without exceeding the scope of the invention. To those skilled in the art, it will be apparent that the method described in this disclosure as the present invention is not limited to refrigeration systems used on containers transporting frozen goods via rail or roadway, but to any such refrigeration system that would benefit from the method herein described.

REFERENCE NUMERALS IN THE DRAWING 10 generator set
12 generator
14 engine
16 controller
18 power cable
20 controller display
22 controller keyboard
24 controller memory unit
26 load
30 drive shaft
32 connection cable means
34 connection cable means
40a sensor
40b sensor
40c sensor
40d sensor
62 enclosure walls
63 shutting down/restarting means
70 start/stop controller
72 load sensor
74 ambient temperature sensor

What is claimed is:

1. A system for automatically starting and stopping an electrical generator set and a programmed microprocessor to regulate its operation, comprising:
an ambient temperature sensing means;
means to interrupt high voltage current flow between the generator and the load;
a load sensing means whose signal determines:
a) when to disconnect the high voltage current between the generator and the load, and then disconnect the control voltage, thereby, initiating generator shutdown, and
b) when to reconnect the control voltage, thereby, initiating generator start up sequence and reconnecting the control voltage, and, after a predetermined time, reconnecting the high voltage current between the generator and the load; and
a logic means responsive to said ambient temperature sensing means being in signal transmitting and receiving relation with said load sensing means to start and stop the generator.

2. The system as claimed in claim 1, wherein said electrical generator set comprises a generator driven by an engine, a controller in signal transmitting and receiving relation with the engine, and means for sensing engine operating parameters based upon control sensor readings.

3. The system as claimed in claim 1, further including operator interface means such as a controller display and a keyboard for entering commands.

4. The system as claimed in claim 1, further including a memory unit to maintain a log of certain engine operating parameters, their values and the time at which those values occurred and to store other data.

5. The system as claimed in claim 1, wherein said system is capable of controlling the starting and stopping of generators manufactured by any manufacturer of such components.

6. The system as claimed in claim 1, wherein said system may be retrofitably installed on generators and work in conjunction with and supplemental to, existing controls and in no way interfere with normal engine control systems.

7. A system for automatically controlling the starting and stopping of an electrical generator set using a programmed microprocessor, an ambient temperature sensing means and a load sensing means to regulate its operation, comprising:
means to interrupt high voltage current flow between the generator and the load;
a logic means responsive to said ambient temperature sensing means being in signal transmitting and receiving relation with said load sensing means whose signal determines:
a) when to disconnect the high voltage current between the generator and the load, and then disconnect the control voltage, thereby, initiating generator shutdown, and
b) when to reconnect the control voltage, thereby, initiating generator start up sequence and reconnecting the control voltage, and, after a predetermined time, reconnecting the high voltage current between the generator and the load.

8. The system as claimed in claim 7, wherein said electrical generator set comprises a generator driven by an engine, a controller in signal transmitting and receiving relation with the engine, and means for sensing engine operating parameters based upon control sensor readings.

9. The system as claimed in claim 7, further including operator interface means such as a controller display and a keyboard for entering commands.

10. The system as claimed in claim 7, further including a memory unit to maintain a log of certain engine operating parameters, their values and the time at which those values occurred and to store other data.

11. The system as claimed in claim 7, wherein said system is capable of controlling the starting and stopping of generators manufactured by any manufacturer of such components.

12. The system as claimed in claim 7, wherein said system may be retrofitably installed on generators and work in conjunction with and supplemental to, existing controls and in no way interfere with normal engine control systems.

13. An automatic stop and restart control system for an electrical generator set provided with an integrated circuit microprocessor device, an ambient temperature sensing means and a load sensing means to regulate its operation, said system comprising:
means to interrupt high voltage current flow between the generator and the load;
a logic means responsive to said ambient temperature sensing means being in signal transmitting and receiving relation with said load sensing means whose signal determines:
a) when to disconnect the high voltage current between the generator and the load, and then disconnect the control voltage, thereby, initiating generator shutdown, and
b) when to reconnect the control voltage, thereby, initiating generator start up sequence and reconnecting the control voltage, and, after a predetermined time, reconnecting the high voltage current between the generator and the load.

14. The system as claimed in claim 13, wherein said electrical generator set comprises a generator driven by an engine, a controller in signal transmitting and receiving relation with the engine, and means for sensing engine operating parameters based upon control sensor readings.

15. The system as claimed in claim 13, further including operator interface means such as a controller display and a keyboard for entering commands.

16. The system as claimed in claim 13, further including a memory unit to maintain a log of certain engine operating parameters, their values and the time at which those values occurred and to store other data.

17. The system as claimed in claim 13, wherein said system is capable of controlling the starting and stopping of generators manufactured by any manufacturer of such components.

18. The system as claimed in claim 13, wherein said system may be retrofitably installed on generators and work in conjunction with and supplemental to, existing controls and in no way interfere with normal engine control systems.

* * * * *